July 5, 1955 C. L. BEATTIE 2,712,624

MAGNETIC MEMORY UNIT FOR MOTOR CONTROL SYSTEM

Filed March 31, 1953 2 Sheets-Sheet 1

Inventor:
Clare L. Beattie,
by Paul A. Frank
His Attorney.

July 5, 1955 C. L. BEATTIE 2,712,624

MAGNETIC MEMORY UNIT FOR MOTOR CONTROL SYSTEM

Filed March 31, 1953 2 Sheets-Sheet 2

Inventor:
Clare L. Beattie,
by Paul A. Frank
His Attorney.

United States Patent Office 2,712,624

Patented July 5, 1955

2,712,624

MAGNETIC MEMORY UNIT FOR MOTOR CONTROL SYSTEM

Clare L. Beattie, Ballston Lake, N. Y., assignor to General Electric Company, a corporation of New York Application March 31, 1953, Serial No. 345,971

13 Claims. (Cl. 318—306)

The present invention relates to a new and improved magnetic memory unit, and to a control system utilizing such unit.

There are many known types of control systems which utilize memory units to store information pertaining to conditions existing at an earlier stage of a manufacturing process for use in a later stage of the process. The memory units heretofore used in such systems have not been entirely satisfactory, however, due to a number of factors, included among which are the complex nature and impracticality of the design of such units, the relatively difficult maintenance and operational procedures required in order to keep the units running, and the failure of the units to provide accurate and reliable results.

It is, therefore, one object of the present invention to provide a new and improved magnetic memory unit, and a control system utilizing such unit.

Another object of the invention is to provide a magnetic memory unit which is of simple, compact construction, and relatively cheap to manufacture.

Still another object of the invention is to provide a magnetic memory unit which is easy to operate, and requires but very little maintenance.

A still further object of the invention is to provide a magnetic memory unit having the above set forth characteristics which is entirely reliable in operation.

In practicing the invention, a magnetic memory unit for use in a control system is provided, and includes an electrically operable sensing element for developing a control intelligence electric signal, and a length of magnetizable material. A magnetic recording head assembly is disposed adjacent the length of magnetizable material, and is operatively coupled to the sensing element. A magnetic playback head assembly is likewise disposed adjacent the magnetizable material, and a means is provided for moving the length of magnetizable material between the recording and playback head assemblies at a speed which is related to the length of time that the control intelligence is to be memorized. To complete the unit, an output circuit is operatively coupled to the playback head assembly, and serves to utilize the intelligence modulated electric signals reproduced by such assembly.

Other objects, features, and many of the attendant advantages of this invention will be appreciated more readily as the same becomes better understood by reference to the following detailed description, when considered in connection with the following drawings, wherein like parts in each of the several figures are identified by the same reference character and wherein.

Figures 1, 3, 4:
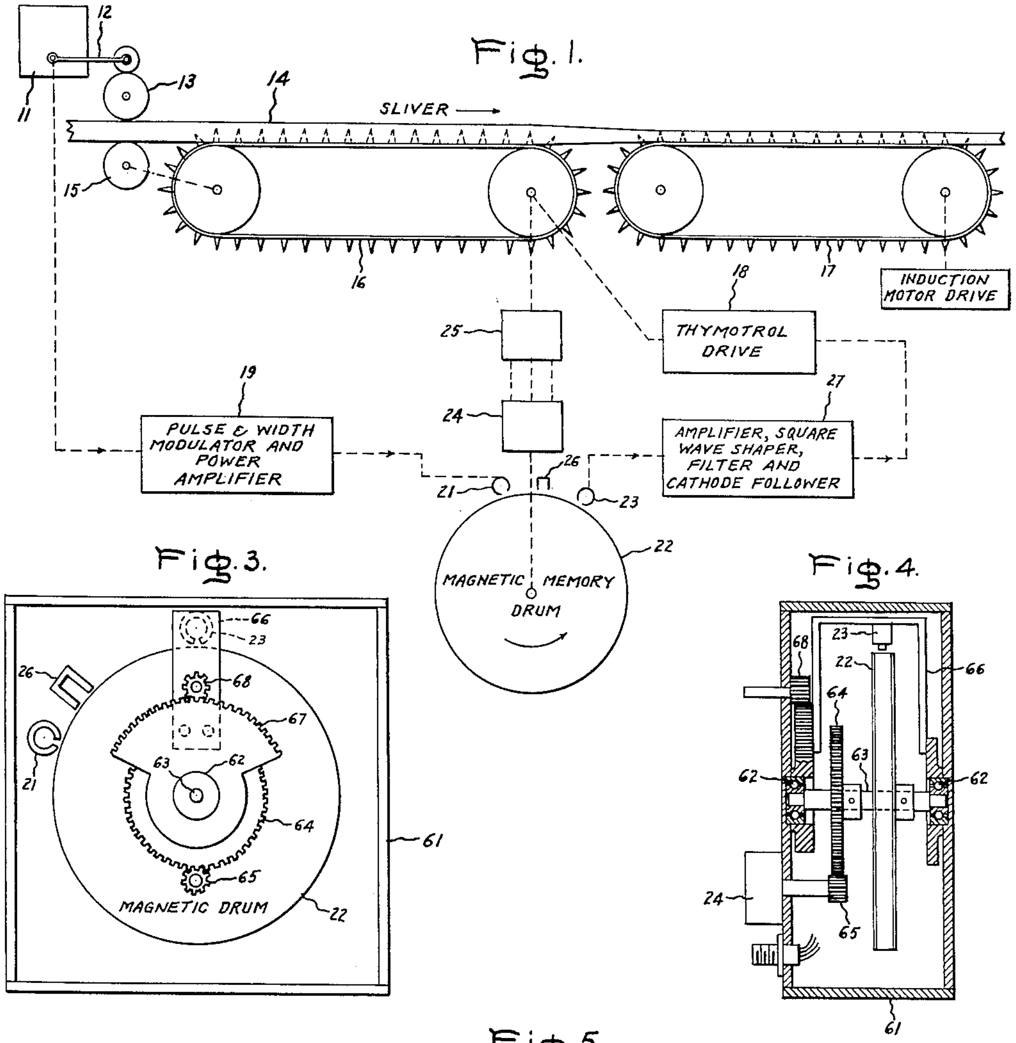
Fig. 1 is a schematic block diagram of a control system for equipment utilized in the manufacture of rope, and incorporating a new and improved magnetic memory unit constructed in accordance with the invention.
Fig. 3 is a plan view of a rotatable drum having a magnetizable peripheral surface, and comprising a part of the magnetic memory unit illustrated in Fig. 1.
Fig. 4 is a sectional view of the drum shown in Fig. 3.

The control diagrammatically illustrated in Fig. 1 of the drawing includes a sensing element 11 having a movable arm 12 which rides upon a roller 13 that engages the rope stock or sliver 14 whose thickness is to be controlled by the system. Roller 13 cooperates with a second roller 15 to pass the sliver 14 therebetween, and is resiliently mounted so that it follows substantially the variations in thickness of the sliver 14. Sliver 14 is drawn along by rollers 13 and 15 and passed to a slow chain drive assembly 16, and a fast chain drive assembly 17 which operate at a speed ratio of about 6 to 1, and cooperate in the area of the second chain assembly to comb and elongate sliver 14 in the manner indicated in the drawing. This combing or elongation occurs due to the fact that as the sliver passes from the slow chain drive assembly to the fast chain drive assembly, the portion thereof engaging the fast chain drive assembly is speeded up while that portion still engaging the slow chain drive assembly is retained at the same speed, thereby resulting in combing or elongating the sliver. By controlling the speed of the slow chain drive assembly with a variable speed motor, drive unit 18 provides for the variation of elongation of the sliver to maintain the output sliver within desired limits.

In order to control the operation of the motor drive unit 18, the sensing element 11 develops a control intelligence electric signal which is representative of the thickness of the rope stock intermediate rollers 13 and 15. This control intelligence electric signal developed by the sensing element 11 is fed to a pulse width modulator and power amplifier circuit 19 having its output coupled to a recording head assembly 21. The recording head assembly 21 is disposed adjacent to the peripheral magnetizable surface of a rotatable drum 22 adapted to be rotated counterclockwise in the direction indicated by a selsyn motor 24 that is electrically connected to a selsyn generator 25. The selsyn generator 25 is in turn driven by the motor drive unit 18 synchronously with the slow chain drive assembly 16, and generates a controlling signal that locks in the motor 24 in a manner such that a point in the peripheral surface of the drum moves synchronously with a point on the sliver. In this manner the magnetizable surface of the drum is caused to move between recording head assembly 21 and a playback head assembly 23 likewise disposed adjacent the peripheral magnetizable surface of rotatable drum 22. The output of the playback head assembly 23 is electrically connected to an amplifier, square wave shaper, filter network and cathode follower circuit indicated at 27, having its output in turn connected to the motor drive unit 18 to control the same. An erasure head 26 is disposed adjacent the magnetizable peripheral surface of the drum 22 between the recording and playback head assemblies 21 and 23 to prevent carry over effects between each cycle of operation.

In operation, the sliver 14 is caused to pass between the rollers 13 and 15 by the slow and fast chain drive assemblies 16 and 17 until it reaches the work zone intermediate the two drive assemblies. As an elemental section of the sliver passes between the rollers 13 and 15, the sensing element 11 develops a control intelligence electric signal representative of the thickness of the elemental section. This control intelligence electric signal is supplied to multivibrator and amplifier circuit 19 and serves to develop a pulse-width modulated square wave electric signal that is fed to the recording head assembly 21, and magnetically recorded on the magnetizable peripheral surface of rotatable drum 22. By reason of the fact that drum 22 is caused to rotate in synchronism with the movement of the rope stock 14 through the selsyn drive mechanisms, a point on the magnetizable surface of drum 22 moves from a position under the recording head to a position under the playback head, as a corresponding point on the sliver 14 moves from betwen the rollers 13 and 15 to a position where combing or elongation takes place in the zone intermediate the slow and fast chain drive assemblies 16 and 17. Hence, the rotatable drum 22 serves to memorize or delay the electric signal produced by sensing element 11, in time by an amount related to the speed of the moving sliver 14. This electric signal is then reproduced by the playback head assembly 23, and fed to the amplifier and wave-shaping circuit 27. The amplifier and wave-shaping circuit 27 then develops a square wave electric signal which is a substantial reproduction of the signal developed by the pulse width modulator circuit 19. This square wave signal is filtered to a D.-C. signal and is fed to the motor drive unit 18 to control the speed of the slow chain drive assembly 16. In this manner, the amount of elongation occurring in the sliver 14 is controlled by an amount needed in order to produce a substantially uniform sliver thickness at the output of the fast chain drive assembly.

Figure 2:
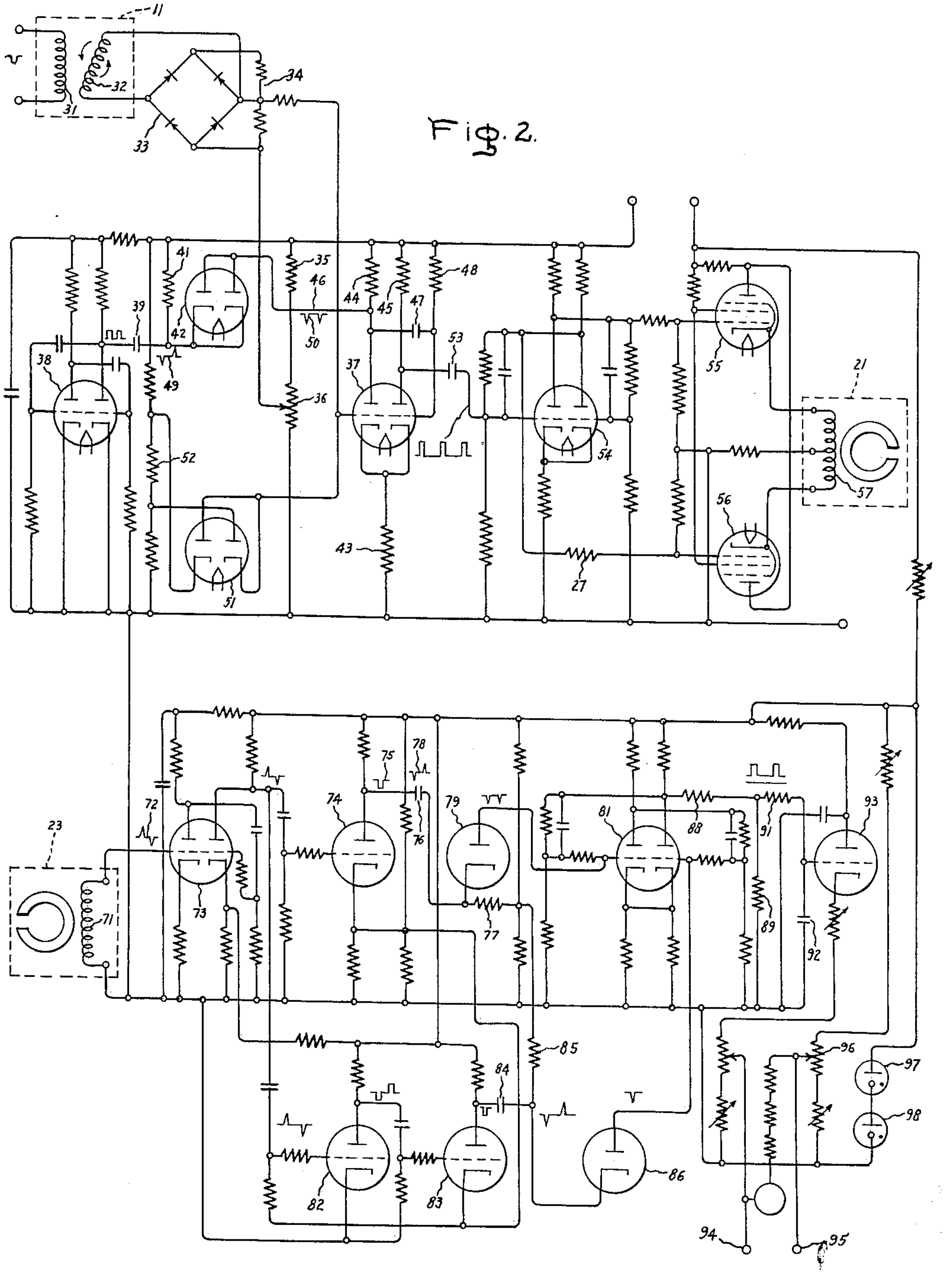
Fig. 2 is a detailed circuit diagram of the magnetic memory unit included in the control system of Fig. 1.

A more detailed disclosure of the magnetic memory unit comprising part of the present invention can be obtained from Fig. 2 of the drawings. As is illustrated in Fig. 2, the sensing element 11 comprises a selsyn generator having the rotor winding 31 thereof connected to a source of alternating current electric energy, and having the rotor 31 thereof mechanically connected to the roller arm 12 for movement therewith. Stator winding 32 is electrically connected to a rectifier bridge 33 which has one pair of diagonally opposite terminals connected across the rotor stator 32, and the remaining diagonally opposite terminals thereof connected across a voltage divider comprised by a resistor 34. One terminal of the voltage divider 34 is returned through a reference lead to a point on a second voltage divider formed by a pair of resistors 35 and 36 connected between ground and a source of plate potential, and the remaining terminal of the voltage divider 34 is connected to the control grid of the first triode section of a duo-triode tube 37. Duo-triode tube 37 comprises a part of a standard, cathode-coupled multivibrator which serves as a pulse width modulating circuit, and which is described more fully on pages 2–53 of "Principles of Radar"—edited by members of the MIT Radar School and published by McGraw-Hill. The output signal derived across voltage divider 34 is applied to the pulse width modulating circuit 37 to serve as a modulating signal, and a fixed frequency alternating electric signal is supplied to circuit 37 from a free-running multivibrator comprised by a duo-triode tube 38. Multivibrator 38 is of standard construction and is described more fully on pages 2–44 of the above-identified text book. The substantially square wave fixed frequency electric signal produced by the multivibrator circuit 38 is coupled through a differentiating circuit consisting of a capacitor 39 and a resistor 41 to a duo-diode clipper tube 42 which is in turn connected to the plate circuit of the one of the triode sections of the pulse width modulating tube 37.

As previously stated, the pulse width modulating circuit 37 is of standard construction, and hence need not be described in detail. Briefly, however, the circuit is comprised of the duo-triode tube 37 having the cathode elements of each of the triode sections thereof connected through a common cathode resistor 43 to ground, and having the plate electrodes of the first triode section thereof connected through a plate load resistor 44 to a source of plate potential, and the plate electrode of the second triode section connected through a plate load resistor 45 to the source of plate potential. The fixed frequency, pulsed electric signal produced at the output of diode clipper 42 is connected to the plate element of the first triode section through a conductor 46, and to the control electrode of the second triode section of tube 37 through a coupling capacitor 47. A positive bias is applied to the control electrode of the second triode section through a resistor 48 so that the second triode section of the tube is normally conductive, and conductance of the second triode section develops a positive bias across the common cathode resistor 43 which renders the first triode section of the tube normally non-conductive.

By reason of the above-described construction, pulse width modulating circuit 37 operates in the following manner: the square wave alternating electric signal produced by multivibrator 38 is differentiated by differentiating circuit 39 and 41 to produce a double pip waveform voltage such as that illustrated at 49. The positive peaks of this double pip waveform voltage are removed by the diode clipper tube 42, and the negative pip waveform signal illustrated at 50, applied to the control electrode of the second triode section of tube 37 through conductor 46 and capacitor 47. The second triode section of tube 37 is normally conductive due to the positive bias applied to the control grid thereof through resistor 48, and is maintained in this condition until a negative pip is applied to the control grid through the capacitor 47, whereupon the second triode section becomes non-conductive. Upon the second triode section becoming non-conductive, the positive bias applied to the cathode of the first triode section by the current of the second triode in resistor 43 is removed, and hence the first triode section is allowed to become conductive due to the stationary positive bias applied to the control grid thereof through the reference level circuit provided by voltage divider 35, 36 and the incoming control signal. Upon the first triode section being rendered conductive, a negative bias voltage is applied to the control grid of the second triode section through capacitor 47 caused by the plate current of the first triode through resistor 44 which maintains the second triode section in an offstate until such time that the negative bias voltage leaks off capacitor 47 through the resistor 48. Upon this negative bias being reduced to a sufficiently low value, the second triode section is again rendered conductive, thereby cutting off the first triode section and completing the cycle. The portion of each cycle during which the first triode conducts is determined by the time constant of the resistance-capacitance circuit formed by resistor 48 and capacitor 47, and if there were no varying input signal applied to the control grid of the first triode section of tube 37, the pulse width modulating circuit would operate as a simple cathode coupled, bistable multivibrator circuit for producing a fixed frequency, square wave electric signal. However, upon a varying direct current control intelligence signal being applied to the control grid of the first triode section of tube 37, it can be appreciated that the point in time at which the control grid of the second triode section again assumes control over conduction of that triode section, will vary in accordance with the value of the varying D.-C. signal applied to the control grid of first triode section. Hence, application of the varying direct current control intelligence signal serves to width modulate the square wave electric signal produced by circuit 37.

In order that the reference level of the varying direct current control intelligence signal applied to the control grid of the first triode section of tube 37 be maintained within some predetermined range, a signal clamping circuit is provided which is comprised of a duo-diode tube 51 and a voltage divider 52 formed by three resistors connected in series across the source of plate potential and ground. A conductive path is provided through one diode section to one point on the voltage divider, and then through a second diode section to still another point on the voltage divider in a manner such that upon the varying D.-C. control intelligence signal dropping above or below predetermined levels set by adjustment of the voltage divider 52, either one of the diode sections conducts to thereby clamp the potential of the control grid to the predetermined set value on the voltage divider.

The width modulated square wave electric signal produced by the pulse width modulating circuit 37 is coupled through a coupling capacitor 53 to a standard bistable of flip-flop multivibrator circuit comprised of duo-triode tube 54. For a more detailed description of the construction and operation of the pulse width modulating circuit 37, reference is made to pages 2–50 of the above-identified test book. Briefly, however, the bistable multivibrator circuit 54 serves to improve the wave shape of the width modulated square wave electric signal produced by pulse width modulating circuit 37, and to further amplify the same. The output of bistable multivibrator 54 is fed in push-pull fashion to a pair of power amplifier tubes 55 and 56 which have the cathodes thereof interconnected in push-pull fashion to a common ground return through the respective winding halves of the energizing coil 57 of recording head assembly 21. By this arrangement, the width modulated square wave electric signal produced by width modulating circuit 37 is further shaped and amplified by bistable multivibrator 54, and applied to power amplifier tubes 55 and 56. The power amplifier tubes 55 and 56 serve to apply the width modulated square wave signal at the proper electric current in push-pull fashion to the energizing windings 57 of the recording head assembly 21.

Referring now to Figs. 3 and 4 of the drawings, a preferred mechanical construction of the recording playback head assemblies 21 and 23, and rotatable drum 22, is shown. As is best seen in Fig. 4 of the drawing, the rotatable drum 22 is supported in a housing 61 by a pair of bearings 62, and a rotatable shaft 63. Shaft 63 has a gear wheel 64 keyed thereto which meshes with a pinion 65 driven by selsyn motor 24. By this arrangement, the ratio of the gears 64 and 65 can be designed so that a point on the magnetizable peripheral surface of the rotatable drum 22 moves in synchronism with a corresponding point on the rope sliver. The recording and erasure head assemblies 21 and 26 respectively may be permanently secured to the housing 61 in the manner shown in Fig. 3, but it is preferable that the playback head assembly 23 be mounted on a movable support 66 having a toothed rack formed thereon which cooperates with a pinion 68 for adjusting the distance between the playback head assembly 23 and the recording head assembly 21 to an optimum value. In this manner, the time of playback of a signal relative to a point on the rope sliver can be varied to produce the best overall operation. This is desirable since the combing of the rope sliver occurs over a substantial distance. Also, it is desirable to vary the memory time to allow for the slow response of the driving system of the first chain of the machine.

Adverting again to Fig. 2 of the drawings, the playback head assembly 23 includes a detecting coil 71 which serves to develop an intelligence modulated electric signal from the magnetically recorded intelligence on the drum 22. Because of the inherent differentiating action of the detecting coil 71, this electric signal has a double pip waveform, such as is shown at 72, which is amplified in a two-stage resistance-capacitance coupled amplifier formed by a duo-triode tube 73. The amplifier 73 is of standard construction, and serves to provide an amplified, double pip waveform electric signal which is coupled in parallel to two separate wave shaping channels.

The first of the wave shaping channels includes an overdriven amplifier comprised of a triode tube 74 which serves to remove the negative going pips from the double pip waveform signal available at the output of amplifier 73, as well as to square off the end portions of positive going pips. This wave shaping feature is obtained by reason of the fact that the amplifier 74 is biased beyond cutoff and operates between cutoff and saturation, and since it is overdriven by the positive pip signal applied to the control grid thereof, it removes the sloped upper portions of the positive pip waveform. This action results in producing a substantially square wave negative going electric signal at the output of amplifier 74, indicated at 75, which is differentiated by a differentiating circuit comprising a capacitor 76 and a resistor 77. Differentiating circuit 76, 77 serves to again produce a double pip waveform signal, such as is indicated at 78, which is applied through a diode clipping tube 79. The diode 79 has one of the electrodes thereof coupled to the differentiating circuit 76 and 77, and the remaining electrode thereof connected to the input of a bistable multivibrator comprised of a duo-triode tube 81. The bistable multivibrator 81 is similar in construction to the multivibrator 54, and has two operating states wherein either the first triode section is conducting while the second triode section is not conducting, or the second triode section is conducting while the first triode section is not conducting. The negative going pip waveform electric signal produced in the first wave shaping channel and appearing at the output of diode clipper 79 is applied to the control grid of the first triode section of duo-triode 81 for rendering that triode section non-conductive, and hence allowing the second triode section to become conductive. The second triode section of duo-triode 81 is in turn controlled by a negative going pip waveform signal produced in the second wave shaping channel, and applied to the control grid of the second triode section. In order to develop such a negative going waveform signal, the second wave shaping channel includes a triode tube 82 which serves as an inverting amplifier to shift the phase of the double pip waveform electric signal appearing in the output of amplifier tube 73 through substantially 180°. The inverted double pip waveform signal is applied to the control grid of a triode tube 83 which is operated as an over-driven amplifier in a manner similar to the triode tube 74, and serves to produce a negative going, substantially square wave pulsed electric signal in the plate circuit thereof. This negative-going square wave electric signal is applied through a differentiating circuit that includes a capacitor 84 and a resistor 85, and a diode clipping tube 86 to the control grid of the second triode section of the duo-triode 81 to render that section non-conductive. Hence, it can be appreciated that the negative-going pip waveform signal appearing in the output of the first wave shaping channel serves to trigger the first triode section of duo-triode 81 off while rendering the second triode section conductive, and the negative-going pip waveform voltage appearing in the output of the second wave shaping channel serves to trigger the second triode section of the duo-triode 81 off, while rendering the first triode section conductive. Therefore, bistable multivibrator 81 will be triggered on and off from one operating state to the other by the negative going pip waveform signals available in the output of each of the wave shaping channels. Since the relative position in time of each of the pulses of pip waveform signals is indicative of the intelligence picked up by the sensing element 11 of the system, bistable multivibrator 81 serves to produce a width modulated square wave electric signal which is a substantial reproduction of the electric signal produced by width modulating circuit 37 or bistable multivibrator 54 and applied to recording head assembly 21.

The width modulated, square wave electric signal available at the output terminals of bistable multivibrator 81 is coupled through a divider circuit formed by 88 and 89 and then to a filter circuit formed by a capacitor 92 and resistor 91 to the control grid of a cathode follower circuit comprised of a triode section 93 of a duo-triode tube. Filter circuit 91 and 92 serves to filter the width modulated square wave output signal of bistable multivibrator 81, and to produce a varying level direct current electric signal that is fed through the cathode follower circuit 93 to an output terminal 94 for application to the motor drive unit 18 illustrated in Fig. 1 of the drawings. For the purpose of establishing a proper reference base for the motor drive unit 18, a reference potential is applied to the remaining terminal 95 to such unit from a reference source of power comprised of a voltage divider 96 coupled across a pair of gas discharge tubes 97 and 98 that are in turn energized from an unregulated direct current power supply source.

In operation, the magnetic memory unit illustrated in Fig. 2 develops a control intelligence signal with the sensing element 11, which is fed to the pulse width modulating circuit 37 in conjunction with negative-going timing pulses produced by multi-vibrator 38 and clipper circuit 42. The negative-going timing pulses serve to trigger the pulse width modulating circuit 37 on so that a standard square wave unmodulated electric signal would be available in the output thereof if no control intelligence signal were applied to the pulse width modulating circuit from the sensing element 11. However, upon application of a control intelligence signal to circuit 37, the square wave electric signal produced by the circuit is width modulated in accordance with the intelligence. This width modulated square wave electric signal is applied to the bistable multivibrator 54 which serves to further shape the square wave form electric signal, and to apply the same to the power amplifiers 55 and 56. The power amplifiers 55 and 56 then supply the width modulated square wave signal to the energizing windings 57 of the recording head assembly 21 in push-pull manner. In this fashion, the control intelligence is recorded on the magnetizable surface of the rotatable drum 22 which moves the intelligence thus recorded to the play-back head assembly 23 at a speed which is related to the speed of a corresponding point on the rope sliver being acted on by the control system. The magnetically recorded control intelligence then serves to develop a substantially double pulse waveform electric signal in the detecting coil 71 of the playback head assembly, which signal is amplified by amplifier 73, and fed in parallel to two wave shaping channels. Each of the wave shaping channels develop a negative going, pip waveform, triggering pulse electric signal which is used to trigger bistable multivibrator 81 from one of its operating states to the other to thereby reproduce a width modulated square wave electric signal which corresponds to the width modulated electric signal supplied to recording head assembly 21. This width modulated square wave electric signal is filtered to develop a varying direct current electric signal that is coupled through a cathode follower 93 (used for impedance matching purposes) to the output terminal 94 where it is fed to the motor drive unit 18 for control purposes. From the foregoing discussion, it can be readily appreciated that the magnetic memory unit illustrated in Figs. 1 and 2 of the drawings, provides a greatly improved memory unit for use in control systems which is relatively simple and compact in construction, and is reliable in operation. Further, because the component parts of the unit are of standard construction, and are readily available, the unit is relatively inexpensive to manufacture and easy to maintain in proper operating condition.

Figure 5:
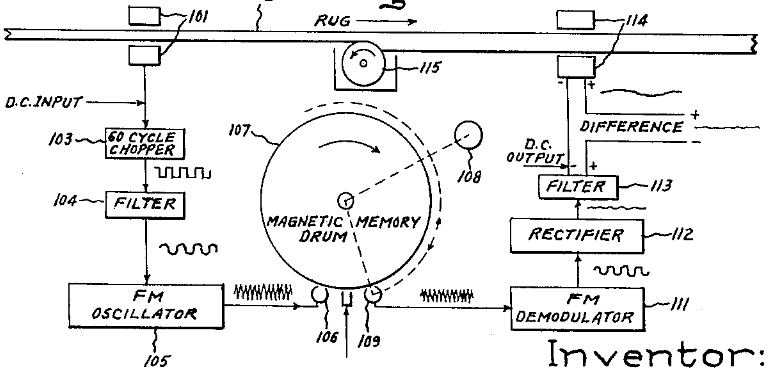
Fig. 5 is a schematic block diagram of a second form of a control system and magnetic memory unit constructed in accordance with the invention.

A second form of a control system utilizing a magnetic memory unit constructed in accordance with the invention, is shown in Fig. 5 of the drawings. The control system illustrated in Fig. 5 serves to automatically maintain the thickness of a finishing applied to rug materials at a predetermined dimension. The system includes a first thickness gauge 101 which may be a beta ray thickness gauge or an X-ray thickness gauge for determining the thickness of a rug material 102 passing between the two sensing elements of such gauge. The first thickness gauge 101 develops a varying direct current control intelligence signal which is converted to an amplitude modulated 60 cycle alternating current electric signal by means of a 60 cycle chopper 103 and a filter circuit 104, connected to the output of the thickness gauge. The amplitude modulated alternating electric signal developed in the output of filter 104 is applied to a frequency modulated oscillator 105 for modulating the output signal produced thereby with the control intelligence derived from thickness gauge 101. The frequency modulated electric signal produced by oscillator 105 is applied to a recording head assembly 106 which magnetically records the signal on the magnetizable peripheral surface of a rotatable drum 107. Rotatable drum 107 is substantially identical in construction to the rotatable drum 22 of the system illustrated in Fig. 1 of the drawings, and is driven by a synchronous motor 108 at a speed related to the speed of movement of the rug 102 so that a point on the surface of the drum 107 coincides with a corresponding point on the rug 102. A playback head assembly 109 is disposed adjacent the magnetizable surface of the rotatable drum 107 for detecting the intelligence magnetically recorded on the drum, and deriving a frequency modulated electric signal which is fed to a frequency modulated signal demodulator 111. The demodulator 111 demodulates the frequency modulated signal and obtains an amplitude modulated alternating current electric signal which is a substantial reproduction of the alternating electric signal available at the output of filter 104. This alternating electric signal is applied to a rectifier 112 and filter 113 which serve to develop a varying direct current electric signal in the output thereof. This varying direct current electric signal is compared to a varying direct current electric signal developed by a second thickness gauge 114 disposed adjacent rug 102 at a point subsequent to the passage of the rug over an applicator 115 which serves to apply a finishing material to the rug body. The varying direct current electric signal developed by thickness gauge 114, therefore, is representative of the combined thickness of the rug body and the finishing material applied thereto by applicator 115, so that by comparison of the direct current electric signal developed by gauge 114, to the electric signal available at the output of filter 113, a difference signal can be obtained which is indicative of the dimensions of the finishing material applied to the rug body by applicator 115. This difference electric signal can then be used to control the operation of the applicator 115 so as to maintain a substantially constant thickness finishing on the rug body.

From the foregoing description, it can be readily appreciated that the invention provides a new and improved magnetic memory unit for use in control systems which unit is both simple and compact in construction, and is entirely reliable in operation. The unit is designed in a manner such that it can be operated by relatively unskilled personnel, and hence is simple to operate. Further because the unit is constructed of standard electronic circuit component parts, it can be manufactured at a relatively low cost, and is easy to maintain. Other advantages, variations, and modifications of the present invention are believed to be possible in the light of the above teachings. It is, therefore, to be understood that changes may be made herein which are within the full intended scope of the invention, as defined by the appended claims.

What I claim as new and desire to secure by Letters Patent of the United States is:

1. A memory unit for a control system including in combination an electrically operable sensing element for developing a control intelligence electric signal, a length of magnetizable material, a magnetic recording head assembly disposed adjacent the length of magnetizable material and operatively coupled to said sensing element for magnetically recording the control intelligence signals on said material, a magnetic playback head assembly likewise disposed adjacent the magnetizable material for reconverting the control intelligence signals magnetically recorded thereon into a control intelligence electric signal, means for moving said length of magnetizable material between said recording and playback head assemblies, and an output circuit operatively coupled to said playback head assembly for utilizing the control intelligence electric signal reproduced thereby, said output circuit including means for regulating the speed of movement of said length of magnetizable material between said recording and playback head assemblies in accordance with the control intelligence.

2. A memory unit for a control system including in combination an electrically operable sensing element for developing a control intelligence electric signal, a rotatable drum having a magnetizable peripheral surface, a magnetic recording head assembly disposed adjacent the magnetizable surface of said rotatable drum and operatively coupled to said sensing element for magnetically recording the control intelligence signals on said surface, a magnetic playback head assembly likewise disposed adjacent the magnetizable surface of said drum for reconverting the control intelligence signals magnetically recorded thereon into a control intelligence electric signal, means for rotating said drum, an erasure head disposed intermediate said recording and playback head assemblies for erasing the magnetically formed intelligence on the magnetized surface subsequent to detection by said playback head assembly and prior to reaching the recording head assembly, and an output circuit operatively coupled to said playback head assembly for utilizing the control intelligence electric signal reproduced thereby, said output circuit including means for regulating the speed of rotation of said drum in accordance with the control intelligence.

3. A memory unit for a control system including in combination an electrically operable sensing element for developing a control intelligence electric signal, a source of alternating electric signals, modulating means operatively coupled to said source of electric signals and to said sensing element for producing a control intelligence modulated electric signal, a length of magnetizable material, a magnetic recording head assembly disposed adjacent said length of magnetizable material and electrically connected to the output of said modulating means for magnetically recording the intelligence modulated electric signals on such material, a magnetic playback head assembly likewise disposed adjacent said length of magnetizable material for reconverting the intelligence magnetically recorded thereon into an intelligence modulated electric signal, means for moving said length of magnetizable material between said recording and playback head assemblies, and an output circuit operatively coupled to said playback head assembly for utilizing the intelligence modulated electric signal reproduced thereby, said output circuit including means for regulating the speed of movement of said length of magnetizable material between said recording and playback head assemblies in accordance with the control intelligence.

4. A memory unit for a control system including in combination an electrically operable sensing element for developing a control intelligence electric signal, a free running multivibrator circuit, a pulse width modulating circuit operatively coupled to the output of said multivibrator circuit and said sensing element for producing a control intelligence pulse width modulated square wave electric signal, a rotatable drum having a magnetizable peripheral surface, a magnetic recording head assembly disposed adjacent the magnetizable surface of the rotatable drum and electrically connected to the output of said modulating means for magnetically recording the intelligence modulated electric signals on such material, a magnetic playback head assembly likewise disposed adjacent said length of magnetizable material for reconverting the intelligence magnetically recorded thereon into an intelligence modulated electric signal, means for rotating said drum, an erasure head disposed intermediate said recording and playback head assemblies for erasing the magnetically formed intelligence on the magnetized surface subsequent to detection by said playback head assembly and prior to reaching the recording head assembly, and an output circuit operatively coupled to said playback head assembly for utilizing the intelligence modulated electric signal reproduced thereby, said output circuit including means for regulating the speed of rotation of said drum in accordance with the control intelligence.

5. A control system for maintaining the characteristics of a material at some desired value including in combination an electrically operable sensing element for developing a control intelligence electric signal, indicative of the condition of the material at a given point in the processing thereof, a source of alternating electric signals, modulating means operatively coupled to said source of electric signals and to said sensing element for producing a control intelligence modulated electric signal, a length of magnetizable material, a magnetic recording head assembly disposed adjacent said length of magnetizable material and electrically connected to the output of said modulating means for magnetically recording the intelligence modulated electric signals on such material, a magnetic playback head assembly likewise disposed adjacent said length of magnetizable material for converting the intelligence modulated signals magnetically recorded thereon into an intelligence modulated electric signal, means synchronized with the movement of the material being processed for moving said length of magnetizable material between said recording and playback head assemblies at a speed related to the length of time the control intelligence is to be memorized, and an ouput circuit operatively coupled to said playback head assembly for applying the intelligence modulated electric signal reproduced thereby to the control unit of the processing mechanism on which the system is used.

6. A control system for a processing mechanism used in maintaining the characteristics of a material at some desired value including in combination an electrically operable sensing element for developing a control intelligence electric signal indicative of the dimensions of a material being processed at a given point of the processing thereof, a free running multivibrator circuit, a pulse width modulating circuit operatively coupled to the output of said multvibrator circuit and said sensing element for producing a control intelligence pulse width modulated square wave electric signal, a rotatable drum having a magnetizable peripheral surface, a magnetic recording head assembly disposed adjacent the magnetizable surface of the rotatable drum and electrically connected to the output of said modulating means for magnetically recording the intelligence modulated electric signals on such material, a magnetic playback head assembly likewise disposed adjacent said magnetizable surface of said drum for converting the intelligence magnetically recorded thereon into an intelligence modulated electric signal, an erasure head disposed intermediate said recording and playback head assemblies for erasing the magnetically formed intelligence on the magnetized surface subsequent to detection by said playback head assembly and prior to reaching the recording head assembly, means synchronized with the movement of the material being processed for rotating the drum at a speed related to the length of time required for a point on the material being processed to move from beneath the sensing element to a position adjacent the controlled processing mechanism, and an output circuit operatively coupled to said playback head assembly for providing the intelligence modulated electric signal reproduced thereby to the controlled processing mechanism.

7. A memory unit for a control system including in combination an electrically operable sensing element for developing a control intelligence electric signal indicative of the dimensions of a material being processed at a given point in the processing thereof, a free running multivibrator, a pulse width modulating circuit having at least two input terminals, one of the input terminals being connected to the output of said free running multivibrator and the remaining input terminal being connected to said sensing element, a bistable multivibrator coupled to the output of said pulse width modulating circuit, a rotatable drum having a magnetizable peripheral surface, a magnetic recording head assembly disposed adjacent the magnetizable surface of said rotatable drum and electrically connected to the output of said bistable multivibrator for magntically recording the pulse width modulated electric signals on said drum, a magnetic playback head assembly likewise disposed adjacent the magnetizable surface of said rotatable drum for reconverting the intelligence magnetically recorded thereon into an intelligence modulated electric signal, an erasure head disposed intermediate said recording and playback head assemblies for erasing the magnetically formed intelligence on the magnetized surface subsequent to detection by said playback head assembly and prior to reaching the recording head assembly, means synchronized with the movement of the material being processed for rotating said drum at a speed related to the length of time the control intelligence is to be memorized, a bistable multivibrator coupled to the output of said playback head assembly for deriving a width modulated pulsed electric signal therefrom representative of the original control intelligence, and a filter circuit connected to the output of said last-mentioned bistable multivibrator for deriving the original control intelligence from the signal produced thereby.

8. A control system for a processing mechanism used in maintaining the characteristics of a material at some desired value including in combination an electrically operable sensing element for developing a control intelligence electric signal indicative of the dimensions of a material being processed at a given point in the processing thereof, a free running multivibrator, a pulse width modulating circuit having at least two input terminals, one of the input terminals being connected to the output of said free running multivibrator and the remaining input terminal being connected to said sensing element, a bistable multivibrator coupled to the output of said pulse width modulating circuit, a rotatable drum having a magnetizable peripheral surface, a magnetic recording head assembly disposed adjacent the magnetizable surface of said rotatable drum and electrically connected to the output of said bistable multivibrator for magnetically recording the pulse width modulated electric signals on said drum, a magnetic playback head assembly likewise disposed adjacent the magnetizable surface of said rotatable drum for reconverting the intelligence magnetically recorded thereon into an intelligence modulated electric signal, an erasure head disposed intermediate said recording and playback head assemblies for earsing the magnetically formed intelligence on the magnetized surface subsequent to detection by said playback head assembly and prior to reaching the recording head assembly, means synchronized with the movement of the material being processed for rotating the drum at a speed related to the length of time required for a point on the material being processed to move from beneath the sensing element to a position adjacent the controlled processing mechanism, a bistable multivibrator coupled to the output of said playback head assembly for deriving a width modulated pulsed electric signal therefrom representative of the original control intelligence, and a filter circuit connected to the output of said last-mentioned bistable multivibrator for deriving the original control intelligence from the signal produced thereby.

9. A system for controlling the speed of movement of a material at a second point in a process in accordance with a characteristic of said material at a prior first point in said process, the system including in combination an electrically operable sensing element for developing a control intelligence electric signal indicative of said characteristic of said material at said first point in said process, a recording medium, a recording head assembly disposed adjacent said recording medium and operatively coupled to said sensing element for recording the control intelligence signals on said recording medium, a magnetic playback head assembly likewise disposed adjacent said recording medium for reconverting the control intelligence signals recorded thereon into control intelligence electric signals, means for moving between said two points said material being processed, means synchronized with the movement between said two points of the material being processed for moving said recording medium between said recording and playback head assemblies, and an output circuit operatively coupled to said playback head assembly for applying the control intelligence signals reproduced thereby to the means for moving said material being processed to control the speed of movement of said material.

10. A system for controlling the speed of movement of a material at a second point in a process in accordance with a characteristic of said material at a prior first point in said process, the system including in combination an electrically operable sensing element for developing a control intelligence electric signal indicative of said characteristic of said material at said first point in said process, a length of magnetizable material, a magnetic recording head assembly disposed adjacent said length of magnetizable material and operatively coupled to said sensing element for magnetically recording the control intelligence signals on said magnetizable material, a magnetic playback head assembly likewise disposed adjacent said magnetizable material for reconverting the control intelligence signals magnetically recorded thereon into control intelligence electric signals, means for moving between said two points said material being processed, means synchronized with the movement between said two points of the material being processed for moving said length of magnetizable material between said recording and playback head assemblies, and an output circuit operatively coupled to said playback head assembly for applying the control intelligence signals reproduced thereby to the means for moving said material being processed to control the speed of movement of said material.

11. A system for controlling the speed of movement of a material at a second point in a process in accordance with a characteristic of said material at a prior first point in said process, the system including in combination an electrically operable sensing element for developing a control intelligence electric signal indicative of said characteristic of said material at said first point in said process, a source of electric pulses, modulating means operatively coupled to said source of electric pulses and to said sensing element for producing a control intelligence pulse-width modulated electric signal, a length of magnetizable material, a magnetic recording head assembly disposed adjacent said length of magnetizable material and electrically connected to the output of said modulating means for magnetically recording the control intelligence modulated electric signals thereon, a magnetic playback head assembly disposed adjacent the magnetizable material for reconverting the control intelligence modulated signals magnetically recorded thereon into control intelligence modulated electric signals, means for moving between said two points said material being processed, means synchronized with the movement between said two points of the material being processed for moving said length of magnetizable material between said recording and playback head assemblies, and an output circuit operatively coupled to said playback head assembly for applying the control intelligence signals reproduced thereby to the means for moving said material being processed to control the speed of movement of said material.

12. A system for controlling the speed of movement of a material at a second point in a process in accordance with the dimensions of said material at a prior first point in said process, the system including in combination an electrically operable sensing element for developing a control intelligence electric signal indicative of the dimensions of said material being processed at said first point in said process, a free running multivibrator, a pulse width modulating circuit operatively coupled to the output of said multivibrator and said sensing element for producing control intelligence pulse width modulated square wave electric signals, a rotatable drum having a magnetizable peripheral surface, a magnetic recording head assembly disposed adjacent the magnetizable surface of said drum and electrically connected to the output of said modulating means for magnetically recording the control intelligence modulated electric signals thereon, a magnetic playback head assembly likewise disposed adjacent the magnetizable surface of said drum for reconverting the control intelligence modulated signals magnetically recorded thereon into control intelligence modulated electric signals, an erasure head disposed intermediate said recording and playback head assemblies for erasing the magnetically formed intelligence on the magnetized surface subsequent to detection by said playback head assembly and prior to reaching said recording head assembly, means for moving between said two points said material being processed, means synchronized with the movement between said two points of the material being processed for rotating said drum, a bistable multivibrator coupled to the output of said playback head assembly for deriving a width modulated pulsed electric signal therefrom representative of the original control intelligence, a filter circuit connected to the output of said bistable multivibrator for deriving the original control intelligence from the signal produced thereby, and means for applying the original control intelligence to the means for moving the material being processed to control the speed of movement of said material.

13. A memory unit for a control system including in combination an electrically operable sensing element for developing a control intelligence electric signal, a recording medium, a recording head assembly disposed adjacent said recording medium and operatively coupled to said sensing element for recording the control intelligence signals on said recording medium, a playback head assembly disposed adjacent the recording medium for reconverting the control intelligence signals recorded thereon into control intelligence electric signals, means for moving said recording medium between said recording and playback head assemblies, and an output circuit operatively coupled to said playback head assembly for utilizing the control intelligence electric signals reproduced thereby, said output circuit including means for regulating the speed of movement of said recording medium between said recording and playback head assemblies in accordance with the control intelligence.

References Cited in the file of this patent

UNITED STATES PATENTS

| | | |
|---|---|---|
| 2,439,446 | Begun | Apr. 13, 1948 |
| 2,540,146 | Stober | Feb. 6, 1951 |